United States Patent
Cleave et al.

(10) Patent No.: US 10,776,158 B2
(45) Date of Patent: Sep. 15, 2020

(54) MANAGEMENT OF APPLICATION DEPLOYMENT ACROSS MULTIPLE PROVISIONING LAYERS

(71) Applicant: Vector Launch Inc., Tucson, AZ (US)

(72) Inventors: Robert Randall Cleave, Half Moon Bay, CA (US); John Edward Metzger, Campbell, CA (US); Shaun B. Coleman, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 16/263,449

(22) Filed: Jan. 31, 2019

(65) Prior Publication Data

US 2020/0250008 A1 Aug. 6, 2020

(51) Int. Cl.
| | |
|---|---|
| G06F 9/48 | (2006.01) |
| G06F 9/50 | (2006.01) |
| H04B 7/185 | (2006.01) |
| G06F 9/455 | (2018.01) |
| H04L 29/08 | (2006.01) |
| H04H 20/74 | (2008.01) |

(52) U.S. Cl.
CPC ........ *G06F 9/4856* (2013.01); *G06F 9/45558* (2013.01); *G06F 9/5077* (2013.01); *G06F 9/5088* (2013.01); *H04B 7/18504* (2013.01); *H04H 20/74* (2013.01); *H04L 67/1004* (2013.01); *H04L 67/1095* (2013.01); *H04L 67/148* (2013.01); *H04L 67/34* (2013.01); *G06F 2009/4557* (2013.01); *G06F 2009/45591* (2013.01)

(58) Field of Classification Search
CPC .. G06F 9/5077; G06F 9/45558; G06F 9/4856; G06F 9/5088; H04L 67/34; H04L 67/1004; H04L 67/148; H04L 67/1095; H04B 7/18504; H04B 7/18526; H04H 20/74
See application file for complete search history.

(56) References Cited

U.S. PATENT DOCUMENTS

| | | | | |
|---|---|---|---|---|
| 7,802,248 B2* | 9/2010 | Broquere | ............... | G06F 9/5077 709/201 |
| 8,903,888 B1* | 12/2014 | Hyser | ................. | G06F 9/45558 709/202 |
| 9,740,465 B1* | 8/2017 | Coleman | ................... | G06F 8/71 |
| 9,874,924 B1* | 1/2018 | Li | ........................ | G06F 9/45558 |
| 9,934,055 B2* | 4/2018 | Baset | .................. | G06F 11/3409 |
| 9,991,951 B2* | 6/2018 | Coleman | ............. | H04L 67/1068 |

(Continued)

*Primary Examiner* — Ramy M Osman (57) ABSTRACT

Systems, methods, and software described herein manage the deployment of applications across multiple provisioning layers. In managing the applications, a management service may monitor resource usage by the applications that are executing in a first provisioning layer, wherein the first provisioning layer comprises physical nodes such as airborne or spaceborne nodes. While monitoring the resource usage, the management service may determine when the resource usage by the applications satisfies migration criteria and, when the applications satisfy the migration criteria, select one or more of the applications to be offloaded to another provisioning layer. Once selected, the management service may initiate deployment of the one or more applications in the other provisioning layer.

25 Claims, 6 Drawing Sheets

(56) References Cited

U.S. PATENT DOCUMENTS

| | | | | |
|---|---|---|---|---|
| 10,069,935 B1* | 9/2018 | Coleman | H04L 67/327 | |
| 2008/0258880 A1* | 10/2008 | Smith | H04L 67/22 | 340/286.02 |
| 2011/0209146 A1* | 8/2011 | Box | G06F 9/5077 | 718/1 |
| 2012/0297016 A1* | 11/2012 | Iyer | G06F 9/5072 | 709/217 |
| 2013/0054734 A1* | 2/2013 | Bond | G06F 9/4856 | 709/217 |
| 2013/0332588 A1* | 12/2013 | Maytal | G06F 11/3428 | 709/223 |
| 2014/0180752 A1* | 6/2014 | Kozloski | G06Q 10/0633 | 705/7.27 |
| 2014/0258357 A1* | 9/2014 | Singh | H04L 67/10 | 709/201 |
| 2014/0310709 A1* | 10/2014 | Nirantar | G06F 9/485 | 718/1 |
| 2015/0019195 A1* | 1/2015 | Davis | G06F 11/3442 | 703/17 |
| 2015/0052254 A1* | 2/2015 | Zhao | H04L 67/101 | 709/226 |
| 2015/0234644 A1* | 8/2015 | Ramanathan | H04L 67/10 | 709/226 |
| 2015/0261574 A1* | 9/2015 | Greden | G06F 9/45558 | 718/1 |
| 2016/0092266 A1* | 3/2016 | Bavishi | G06F 9/4856 | 718/1 |
| 2016/0105373 A1* | 4/2016 | Stephens | H04L 67/10 | 709/226 |
| 2016/0378537 A1* | 12/2016 | Zou | G06F 9/4856 | 718/1 |
| 2017/0230481 A1* | 8/2017 | Wu | H04L 67/34 | |
| 2018/0278720 A1* | 9/2018 | Stephens | H04L 67/34 | |

* cited by examiner

MANAGEMENT OF APPLICATION DEPLOYMENT ACROSS MULTIPLE PROVISIONING LAYERS

BACKGROUND

Satellites and aircraft can be deployed to provide various task-based operations, such as military and civilian observation operations, communications operations, navigation operations, weather operations, and research operations. Satellites and aircraft can include various sensors and communication equipment that are used to perform these desired tasks. For example, a weather satellite may include one or more cameras or imaging sensors that can be used to take images of Earth, and communication equipment that can be used to communicate the images to a control system on Earth. An aircraft drone might include cameras for imaging portions of the Earth and relaying those images to a control station or system. Although satellites and aircraft can both be configured to perform specialized operations, difficulties can arise from the movement of the satellites and aircraft in gathering the required data for the required operations. Additional difficulties can also occur for operations due to limited processing, storage, and sensor resources on any given satellite.

Overview

The technology described herein enhances the deployment of applications to physical nodes over multiple provisioning layers. In one implementation, a management service monitors resource use of physical nodes that correspond to a first provisioning layer and determines when the resource use satisfies migration criteria. When the resource use satisfies the migration criteria, the management service may identify one or more applications deployed in the first provisioning layer to be offloaded to a second provisioning layer. Once identified, the management service may initiate deployment of the one or more applications to the second provisioning layer.

This Overview is provided to introduce a selection of concepts in a simplified form that are further described below in the Technical Disclosure. The Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
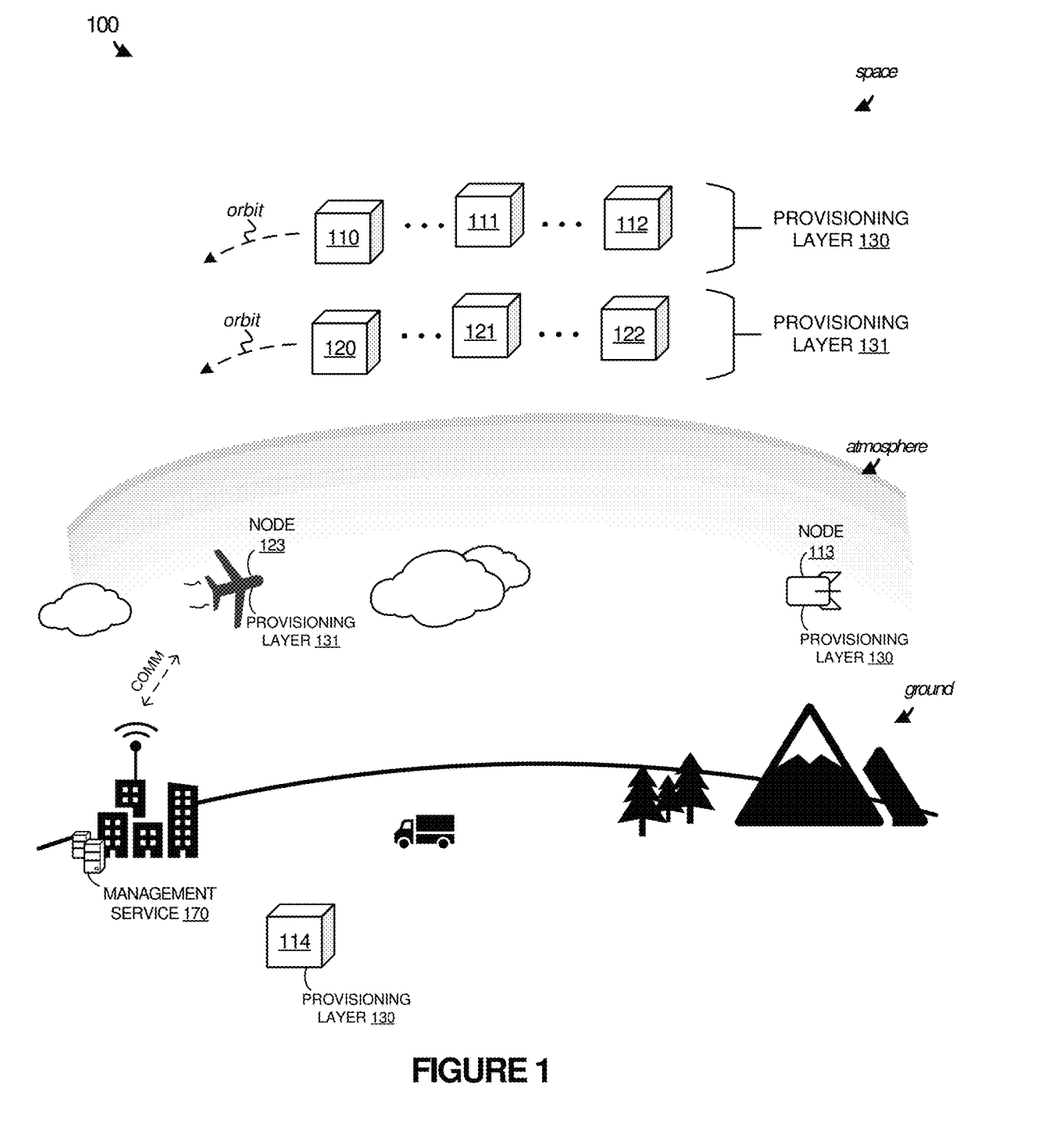
FIG. 1 illustrates a system for deploying applications in physical nodes over multiple provisioning layers according to an implementation.

FIG. 1 illustrates a system 100 for deploying applications in physical nodes over multiple provisioning layers according to an implementation. System 100 includes management service 170 and physical nodes 110-114 and 120-123, wherein physical nodes 110-114 correspond to provisioning layer 130 and physical nodes 120-123 correspond to provisioning layer 131. Physical nodes 110-112 and 120-122 are representative of spaceborne nodes that may comprise satellites, shuttles, capsules, or other similar spaceborne entities. Physical nodes 113 and 123 are representative of atmospheric nodes, such as aircraft, airplanes, drones, balloons, or some other similar airborne objects capable of data processing and/or gathering sensor observation data. Physical nodes 113 and 123 may be mobile or tethered. For example, a balloon device might be mobile, tethered, or both. Physical node 114 is representative of a surface-based data observation node. In some examples, physical node 114 may be mobile and comprise a car, truck, ship, vessel, vehicle, train, or other surface or subsurface-going vessel. In other examples, physical node 114 may be stationary and comprise a building, antenna array, tower, or other structure. Any number of satellite nodes, atmospheric nodes, and surface nodes may be employed. Although demonstrated in the example of system 100 as include two provisioning layers, it should be understood that a system may include any number of provisioning layers.

In operation, physical nodes 110-114 and 120-123 are deployed to provide a platform for various applications generated by tenants of system 100. These applications may provide various operations, including military, commercial, government, and civilian observation or monitoring operations, communications operations, navigation operations, weather operations, and research operations. In deploying the applications, management service 170 is provided, which is representative of a service capable of configuring and managing applications across provisioning layers 130-131. In some implementations, when an application is required, a tenant may generate the software for the application and provide physical requirements for the application and/or a minimum quality of service associated with the application. These requirements may include geographic regions of interest for the application, processing requirements, sensor requirements, storage requirements, or some other similar requirements. Once the requirements are identified, the application may be deployed to one or more physical nodes in one of provisioning layer 130 or provisioning layer 131.

In some implementations, provisioning layers 130-131 may each be representative of a different physical node provider. For example, provisioning layer 130 and physical nodes 110-114 may be representative of nodes that correspond to physical nodes of a first organization that provides an observation platform, while provide layer 131 and physical nodes 120-123 are representative of a second organization that provides an observation platform. Although demonstrated with a single management service in FIG. 1, it should be understood that each provisioning layer of provisioning layers 130-131 may be provided with a management service. In other implementations, provisioning layers 130-131 may correspond to different tiers related to quality of service for an organization providing the physical node platform. These different tiers may provide different processing qualities of service, different storage qualities of service, different sensor qualities of service, or some other similar differing quality of service.

As applications are deployed to a provisioning layer of provisioning layers 130-131, management service 170 and/or the physical nodes within the corresponding provisioning layer may monitor resource usage by the applications. As an example, management service 170 may monitor the communication bandwidth usage by applications of provisioning layer 130. While monitoring the resource usage, management service 170 may determine when the usage satisfies migration criteria (such as exceeding a threshold value). Once the resource usage satisfies migration criteria, management service 170 may initiate an operation to migrate one or more applications to provisioning layer 131.

In some implementations, the applications that are deployed in provisioning layers 130-131 may be deployed as logical nodes, such as virtual machines, containers, or some other similar virtualized endpoint. To provide a platform for the logical nodes, the physical nodes may each execute a management platform that is responsible for managing the resources that are provided to each of the executing logical nodes. In defining the resources that are provided, each tenant may define requirements or minimum qualities of service for the application, wherein the minimum quality of service may define processing requirements, sensor requirements, communication requirements, storage requirements, or some other similar requirements. As a result, when the application is deployed, the management platform may be responsible for providing the corresponding logical node with access to processing resources, storage resources, communication resources, and storage resources required by the application. In some implementations, the physical resources that are allocated to the logical nodes may be available from the same physical node, however, the physical resources may be accessible between hosts. For example, a logical node may use storage and processing resources that are provided by a first physical node, while the management platform may provide access to sensor resources provided by another physical node. These sensors may comprise motion sensors, imaging sensors, heat and/or thermal sensors, electromagnetic spectrum sensors, laser sensors, lidar or radar sensors, proximity sensors, seismic sensors, meteorological sensors, chemical/radiation/nuclear/electronic/signal sensors, or some other similar sensors.

Figure 2:
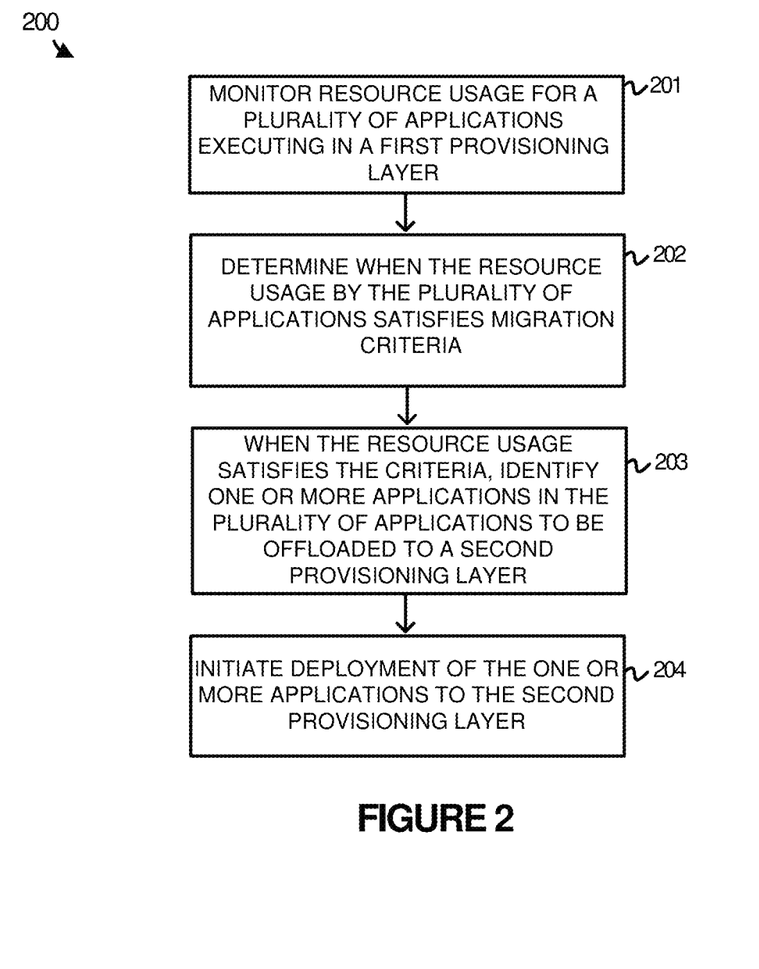
FIG. 2 illustrates an operation of a management service to transition applications from a first provisioning layer to a second provisioning layer according to an implementation.

FIG. 2 illustrates an operation 200 of a management service to transition application from a first provisioning layer to a second provisioning layer according to an implementation. The processes of operation 200 are referenced parenthetically in the paragraphs that follow with reference to systems and elements of system 100 of FIG. 1. In some examples, operation 200 may be implemented by management service 170, however, operation 200 may be implemented wholly or partially using the physical nodes of system 100.

In operation, management service 170 may monitor (201) resource usage for a plurality of applications executing in a first provisioning layer. As an example, management service 170 may monitor the resource usage of applications in provisioning layer 130, wherein the resource usage may comprise processing resource usage, communication resource usage, storage resource usage, or some other similar resource usage for applications that are deployed in provisioning layer 130. In monitoring the resource usage, each of the physical nodes in provisioning layer 130 may communicate information about the resource usage to management service 170, wherein the information may be provided periodically, when usage meets criteria, or at some other interval.

As the resource usage information is monitored by management service 170, operation 200 further determines (202) when the resource usage by the plurality of applications satisfies migration criteria. In some examples, the migration criteria may comprise one or more thresholds related to individual resource usage in the corresponding provisioning layer. These thresholds may correspond to communication resource use (e.g., bandwidth), processing resource use (e.g., usage percentage of processors in the provisioning layer), storage resource use, or some other similar resource use. For instance, management service 170 may monitor bandwidth usage by applications in provisioning layer 130 and, while monitoring the bandwidth usage, management service 170 may determine when the bandwidth usage satisfies a bandwidth threshold. In some implementations, the criteria may be a combination of multiple resource usage values. For example, processing resource usage, storage resource usage, and communication resource usage may be used to generate a usage score. The score may then be compared to a threshold value to determine if the migration criteria are satisfied.

In response to identifying that the migration criteria are satisfied, operation 200 identifies (203) one or more applications in the plurality of applications to be offloaded to a second provisioning layer. In some implementations, each of the applications that are deployed in a provisioning layer may be allocated a quality of service. This quality of service may comprise a quality of service score that is defined by the administrator creating the application, may be defined based on requirements for the application (e.g., processing requirements, communication requirements, and the like), or may be defined in any other similar manner. As an example, provisioning layer 130 may deploy applications that qualify for one of three different quality of service levels. When the migration criteria are satisfied, management service 170 may select applications in one or more of the service levels to be transitioned to another provisioning layer 131. In some implementations, the lower quality of service levels may be transitioned to the other provisioning layer. In other implementations, the higher quality of service levels may be transitioned to the other provisioning layer.

Once the one or more applications are identified for offloading, management service 170 may initiate (204) deployment of the one or more applications to the second provisioning layer and stop execution or operations of the one or more applications in the first provisioning layer. In deploying the one or more applications, management service 170 may distribute the one or more applications to corresponding nodes, initiate operation or execution of the applications, provides state information (e.g. sensor data of interest, processed/unprocessed data, and the like), or implement some other similar operation to provide the application functionality in the second provisioning layer. Referring to the example of transitioning one or more applications from physical nodes of provisioning layer 130 to physical nodes of provisioning layer 131, management service 170 determines the configuration and deployment requirements for the application in provisioning layer 131. The configuration and deployment characteristics for deploying the application in provisioning layer 131 may include communication protocol configurations, sensor protocol configurations, or other similar protocol requirements associated with provisioning layer 131, may comprise processing and storage requirements for provisioning layer 131, or may comprise some other similar requirements for deploying the application in provisioning layer 131. In some examples, the different provisioning layers may each include their own requirements for applications, which may include how the applications communicate in the environment over the physical nodes, how the applications interface with the sensors, or some other similar requirement. As a result, an image for an application that is deployed in provisioning layer 130 may be incapable of being deployed in provisioning layer 131 without modification to the application by management service 170.

In some examples, when an application is developed for a provisioning layer, management service 170 may generate a first image for the application to be deployed in accordance with the requirements of the provisioning layer. However, when the application is migrated to a second provisioning layer, which may operate as part of a second physical node provider, management service 170 may be required to generate another image for the application in accordance with the requirements of the second provisioning layer. The images and configurations for each of the provisioning layers may be generated when the application is initially deployed or may be generated when the images are required. For example, when an application is to be offloaded from provisioning layer 130 to provisioning layer 131, management service 170 may generate the required deployment configuration (e.g., image) to support the application on provisioning layer 131.

Although demonstrated in the example of FIG. 1 using two provisioning layers, it should be understood that any number of provisioning layers may be deployed in a system. In at least one implementation, when a migration of applications is required, management service 170 may determine which of the of the provisioning layers are capable of processing the applications. This determination may be made based on objects of interest for the applications in relation to coverage areas for the various provisioning layers, may be based on the availability of the resource availability of the various provisioning layers, or may be based on any other similar factor. As an example, if an application in a first provisioning layer used sensors to monitor an object of interest, management service 170 may determine which of the other provisioning layers had coverage of the object of interest, had sensors capable of covering the object of interest, and had processing resources capable of supporting the application. Once another provisioning layer is identified that can support all, or the largest portion, of the requirements for the application, then management service 170 may initiate deployment of the application using the identified provisioning layer.

In some implementations, when a migration event occurs for a first provisioning layer, only a portion of an application may be transitioned from the first provisioning layer to a second provisioning layer. For example, an application may migrate the processing operations to a second provisioning layer, while the sensor resources are maintaining in the first provisioning layer. Advantageously, the application may maintain the required sensor resources from the first set of physical nodes, and offload the processing resources to the second set of physical nodes to maintain an overall quality of service requirement for the application. Further, in some implementations, an application may be deployed across multiple provisioning layers. For example, an application may be deployed in provisioning layer 130 and provisioning layer 131, wherein each of the provisioning layers may be used to provide sensor resources, storage resources, processing resources, or some other similar resource to the application. In some examples, to facilitate the operations of the application the physical nodes of provisioning layers 130-131 may be configured to communicate directly, however, the nodes may communicate via management service 170 or some other bridging entity. During the operation of the application, a provisioning layer may encounter a migration event that causes at least a portion of the application to migrate from a first provisioning layer to a second provisioning layer. As a result, processing operations, storage operations, sensor operations, or some other similar operation related to the application may be migrated to the second provisioning layer. The migration of the operations or resources from the first provisioning layer to the second provisioning layer may be based on the quality of service associated with the application (e.g. the application requires a quality of service that only the second provisioning layer can provide), may be based on the resource usage data associated with the migration event, or may be based on some other similar factor. For example, if processing resource usage causes the migration event, then the processing operations for the application may be migrated from the first provisioning layer to the second provisioning layer.

Although demonstrated in the example of FIG. 2 as migrating applications when the criteria are satisfied, in some implementations the criteria may be used to trigger a migration of at least a portion of an application at a later time. For example, management service 170 may monitor resource usage in a provisioning layer and determine that the resource usage satisfies criteria that indicates that the resource usage is frequently increased during a particular period (e.g., time of day, week, or some other interval). When the criteria are satisfied, management service 170 may migrate at least a portion of an application from the provisioning layer to a second provisioning layer to ensure quality of service is maintained for the various applications in the system. As an illustrative example, applications operating in provisioning layer 130 may at a frequent interval attain a resource usage that is associated with migration criteria. As a result, management service 170 may at, or prior to the future interval, initiate a migration of at least one application to ensure that each of the applications is provided the required quality of service. This migration may identify applications with the highest quality of service, applications with the lowest quality of service, or some other quality of service value to ensure that each of the applications are provided proper resources for execution.

In at least one implementation, in implementing the predicted migration, management service 170 may monitor resource usage for a plurality of applications that are executing in a first provisioning layer. While monitoring the resource usage, management service 170 may identify an anticipated time for the resource usage to meet migration criteria. This anticipated time may be determined based on trends in the resource usage over time that can identify predicted intervals for which the resource usage meets migration criteria. The trends may be identified based on machine learning, pattern matching, trend analysis, or some other similar information based on the resource usage data from the physical nodes in the provisioning layer. Once the anticipated time for the resource usage to meet migration criteria is identified, management service may identify a migration time that is earlier than the anticipated time, identify one or more applications to be offloaded to a second provisioning layer, and initiate deployment of the one or more applications in the second provisioning layer at the migration time. In some implementations, the migration time may be determined based on the amount of time required to migrate the required one or more applications to the second provisioning layer.

As an illustrative example, management service 170 may monitor resource usage for applications executing in provisioning layer 130. While monitoring the resource usage, management service 170 may identify an anticipated time for the resource usage to meet migration criteria. This migration criteria may correspond to a threshold amount of resources being used, such as processing resources, storage resources, communication resources, sensor resources, or some other similar resource, including combinations thereof. In at least one implementation, management service 170 may identify trends indicative of times that the resource usage meets migration criteria. For example, if the resource usage in provisioning layer 130 met migration criteria at or near the same time of day for multiple days, management service 170 may determine an anticipated time based on the trend of meeting the criteria. Once the anticipated time is identified for the applications to meet migration criteria, management service 170 may identify a migration time that is earlier than the migration time. In some implementations, the migration time may be determined based on ensuring that the provisioning layer never attains the migration criteria. In particular, the migration time may be set to ensure that all applications are migrated prior to the resource usage meeting the criteria. After identifying the migration time and the applications for migration, management service 170 may deploy the identified applications in the alternative provisioning layer or layers. These applications may be selected based on a quality of service requirement for the applications, based on the resource usage requirements of the application, or based on some other similar factor.

In some implementations, the anticipated time may comprise a point in time or may comprise a range of time in minutes, hours, days, or some other similar period. The anticipated time may be based on the resource usage in the entire provisioning layer or may be based on resource usage in a portion of the provisioning layer. For example, an increased load may exist in nodes 111-112. As a result, management service 170 may migrate applications from the corresponding physical nodes to physical nodes in an alternative provision layer or layers.

In some implementations, once one or more applications are migrated to a second provisioning layer, management service 170 may determine when the resource usage by the applications meets second criteria, wherein the second criteria may indicate when the applications could be returned to their previous configuration. In one example, management service 170 may monitor resource usage by the remaining applications in the provisioning layer and determine when the resource usage falls below a threshold. When the resource usage falls below the threshold, management service 170 may initiate the process to redeploy the migrated applications to the provisioning layer. This redeployment process may include identifying state information for the applications, wherein the state information may include processed and unprocessed sensor data, identifiers corresponding to objects of interest, or any other similar data. This information may then be provided to the applications when they are redeployed in the provisioning layer. In redeploying the applications in the provisioning layer, the redeployment may comprise initiating execution of the applications, wherein the applications may remain in a dormant (sleep, stopped, etc.) from the migration until the system should be reverted to the previous state. In some implementations, the redeployment may further include providing the executable application to any required physical nodes in the provisioning layer, providing any state information to the applications in the provisioning layer, or providing any other similar deployment operations to make the applications executable in the provisioning layer.

Figure 3:
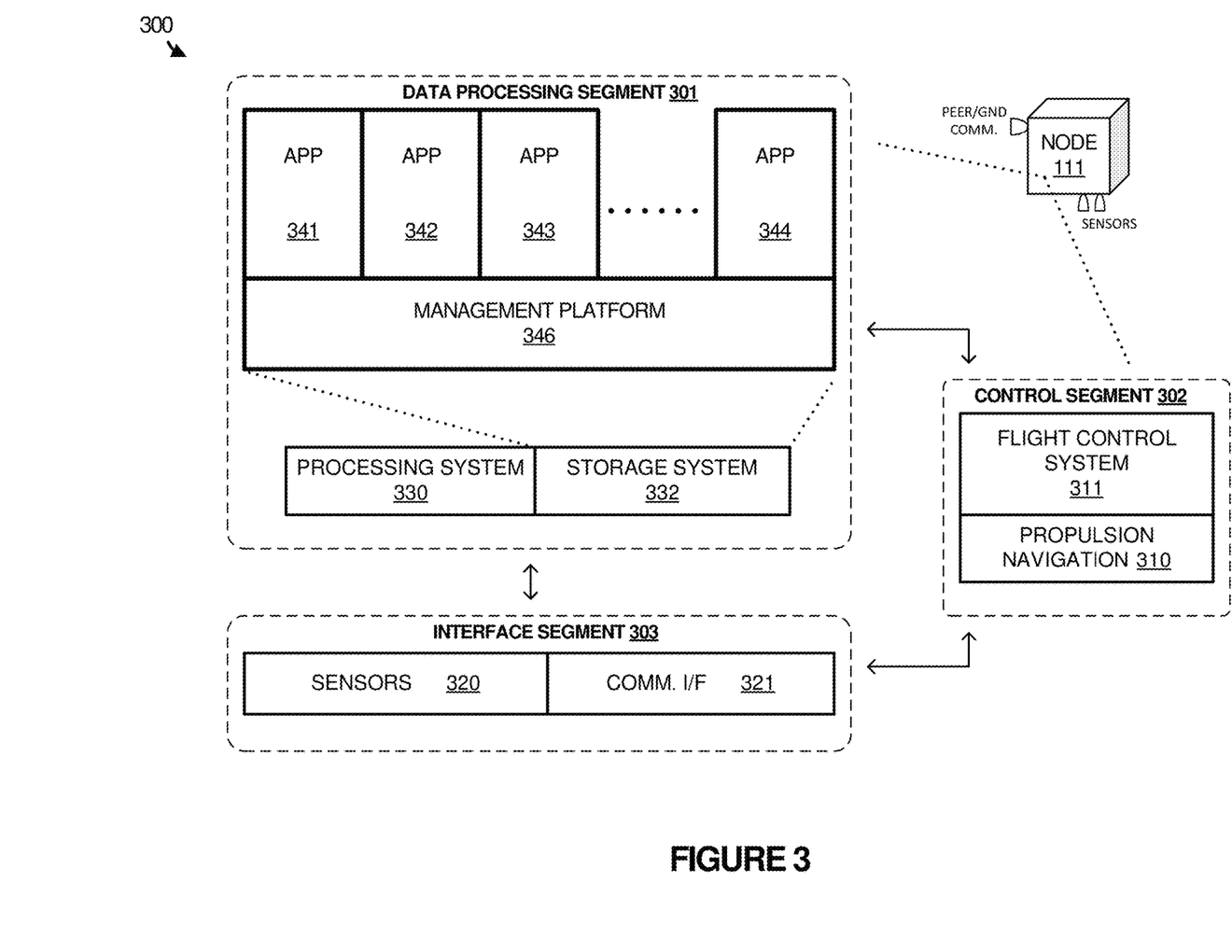
FIG. 3 illustrates an expanded view of a physical node according to an implementation.

FIG. 3 illustrates an expanded view 300 of a physical node 111 from FIG. 1 according to an implementation. Physical node 111 can be an example of any of nodes 110-112 and 130-132 of FIG. 1, although variations are possible. Physical node 111 includes data processing segment 301, control segment 302, and interface segment 303. Data processing segment includes processing system 330 and storage system 332 that stores applications 341-344 that execute via management platform 346. Control segment includes flight control system 311 and propulsion navigation 310. Interface segment 303 includes sensors 320 and communication interface 321.

As described herein, physical nodes may be deployed by a service provider that permit various tenants to deploy and execute applications that provide various operations. These operations may include military and civilian observation operations, communications operations, navigation operations, weather operations, and research operations. As depicted in expanded view 300, data processing system 301 includes processing system 330 and storage system 332, where storage system 332 stores management platform 346 (operating system, hypervisor, or the like), and applications 341-344. Applications 341-344 execute on top of management platform 346 and may operate inside of one or more logical nodes, where the logical nodes may comprise containers, virtual machines, or some other similar virtualized element.

In deploying an application to the physical nodes of the system, a management service may determine requirements of the application, wherein the requirements may comprise geographical requirements (e.g., defined locations of interest for sensor or communication data), may comprise processing requirements, sensor requirements, storage requirements, or some other similar requirements. These requirements may be defined by the tenant generating the application, wherein the tenant may be provided with an interface to select the requirements for the application. Once the requirements are defined for the application, the application may be deployed to one or more physical nodes of a provisioning layer. Once deployed, management platform 346 may provide the application with the requisite resources, wherein the resources may be located on physical node 111 or may be located on one or more other physical nodes. For example, while application 341 may execute on physical node 111, the sensor resource for the application may be provided by another physical node in the same provisioning layer as physical node 111. As a result, management platform 346 may be responsible for providing an interface between the application and the corresponding sensor, such that the application processes data from the sensor as if the sensor were collocated on the same physical node.

As the applications execute on the various physical nodes of a provisioning layer, the management service for the provisioning layer may monitor resource usage on the physical nodes of the layer. This resource usage information may be related to the processing system resources, communication system resources, or some other similar resources of the physical nodes in the provisioning layer. In some implementations, management platform 346 may be used to monitor the resource usage by applications 341-344 and transmit the resource usage information to a management service for processing. This transmittal of the resource usage information may be provided periodically, may be transmitted when usage meets criteria, or may be transmitted at any other interval. As an example, when the communication bandwidth for physical node 111 attains a particular value, physical node 111 may transmit resource usage information to the management service. Once the resource usage information is obtained from the various physical nodes in provisioning layer 130 associated with physical node 111, the management service may determine when the resource usage satisfies migration criteria and, when the resource usage satisfies the criteria, may transition or migrate one or more application in provisioning layer 130 to another provisioning layer 131. For example, the management service may determine that application 344 is to be transitioned to physical nodes associated with provisioning layer 131. As a result, application 344 may stop execution on physical node and initiate execution on another physical node that belongs to provisioning layer 131. In some implementations, physical node 111 may determine state information for application 344 and provide the state information either directly, or indirectly via management service 170, to the physical node operating in provisioning layer 131. This state information may include processed and unprocessed sensor data, information about objects of interest, or some other similar state information for the application.

In addition to the data processing operations provided in data processing segment 301, physical node 111 further includes control segment 302. Control segment 302, which may be communicatively linked to data processing segment 301 and interface segment 303, is responsible for logistical control elements of physical node 111. The operations may include managing the deployment of solar panels on a satellite, managing the positioning of a satellite with regards to the Earth or the sun, providing a spaceborne sensor pointing and control, autonomously managing target decks or tasking priorities, or any other similar operation. When physical node 111 comprises an aircraft or atmospheric node, then control elements can include flight control systems, power systems, navigation systems, sensor pointing and control, autonomously managing target decks or tasking priorities, among other elements. When physical node 111 comprises a surface node, then control elements can include propulsion elements, power systems, powertrains, navigation systems, and the like. A flight control system might not be employed in all node types, such as stationary surface nodes.

In at least one example, flight control system 311 may monitor for requests from data processing segment 301 and determine whether the node can accommodate the request. As an example, application 344 may require movement of a satellite, aircraft, or vehicle to provide an operation with respect to a sensor of sensors 320. Control segment 302 may determine whether the movement is permitted and implement the required action if permitted. The determination of whether an action is permitted by control segment 302 may be determined based on other applications executing on the node, based on flight requirements of the node, or based on some other similar mechanism.

Also depicted in expanded view 300 is interface segment 303 with sensors 320 and communication interface 321. Interface segment 303 may be communicatively coupled to data processing segment 301 and control segment 302. Sensors 320 may comprise imaging sensors, heat sensors, proximity sensors, light sensors, or some other similar type of sensor. Sensors 320 may be accessible to applications 341-344 executing in data processing segment 301 and may further be accessible to one or more other applications executing on other nodes of the system. In at least one implementation, each of the sensors may be allocated to one or more logical nodes, where the logical nodes may each access the sensor during defined time periods, may jointly obtain data derived from the sensor at the same time (e.g. all logical nodes can access the same imaging data), or may be provided access to sensors at some other interval. In addition to sensors 320, interface segment 303 further includes communication interface 321 that may be used to communicate with other physical nodes and/or management systems for system 100. In some examples, communication interface 321 may work with management platform 346 to control the application communications. Thus, if application 341 required a communication with another physical node to obtain sensor data from the physical node, communication interface 321 may forward the communication to the appropriate node and obtain the data from the node.

While demonstrated in the example of expanded view 300 using a satellite node, physical nodes may be represented in a variety of forms. These physical nodes may comprise airplanes, drones, balloons, land vehicles (cars, trucks, trains, and the like), water vehicles, or some other similar physical node. These physical nodes may include a data processing segment capable of providing a platform for the applications executing thereon, may comprise a communication interface to communicate with other physical nodes and/or control systems, and may further comprise one or more sensors capable of gathering required data for the applications executing thereon.

Figure 4:
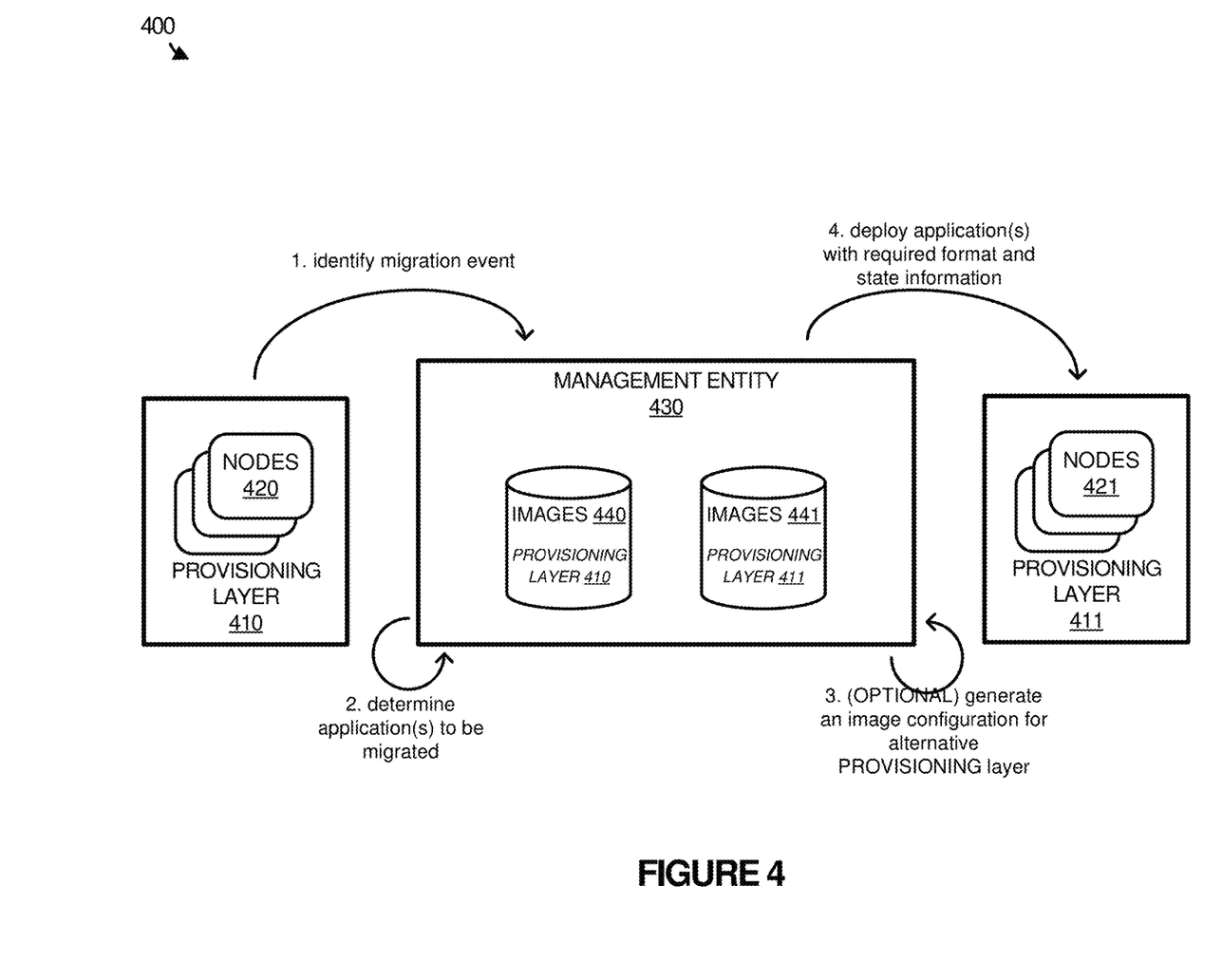
FIG. 4 illustrates an operational scenario of migrating an application from a first provisioning layer to a second provisioning layer according to an implementation.

FIG. 4 illustrates an operational scenario 400 of migrating an application from a first provisioning layer to a second provisioning layer according to an implementation. Operational scenario 400 includes provisioning layers 410-411 with corresponding physical nodes 420-421, and further includes management entity 430 with images 440-441 that each correspond to a provisioning layer of provisioning layers 410-411.

As depicted in operational scenario 400, management entity 430, which is an example of management service 170 of FIG. 1, may identify, at step 1, a migration event for an application operating on physical nodes 420. In some implementations, the migration event may be determined from resource usage information for physical nodes 420, wherein physical nodes 420 may provide information about the resource usage to management entity 430. As the resource usage information is obtained from the physical nodes of provide layer 410, management entity 430 may determine that the resource usage satisfies one or more migration criteria. In some implementations, the migration criteria may relate to a single usage attribute, such as communication bandwidth, however, the migration criteria may be satisfied based on information from multiple attributes. For example, multiple attributes of the resource usage information, such as bandwidth usage, processing resource usage, and the like, may be used to generate a score and the score may be used to determine when the resource usage satisfies the criteria.

In response to identifying the migration event, management entity 430 determines, at step 2, one or more applications to be migrated from provisioning layer 410 to provisioning layer 411. In some examples, the applications for migration may be identified based on the quality of service allocated to the application. This quality of service may be expressly provided by the tenant at the time of generating the application, may be determined based on the resource requirements for the application, or may be determined based on any other similar factor. In some examples, the applications with the lower quality of service may be migrated to another provisioning layer, however, it should be understood that applications with a higher quality of service may be migrated in some examples. In determining which of the applications to be migrated, management entity 430 may identify a first application for migration and determine whether the migration criteria are still met. If the migration criteria are still met, management entity 430 may select another application to migrate to provisioning layer 411 until the resource usage fails to meet the migration criteria or some other criteria to stop the migration of applications to provisioning layer 411.

Once the applications are identified for the migration, management entity 430 may optionally generate, at step 3, an image configuration for the one or more applications in the alternative provisioning layer. In some implementations, each provisioning layer of provisioning layers 410-411 may require a different image or configuration to execute the required applications. This configuration may comprise communication protocol configurations, sensor interface configurations, or some other similar configuration. For instance, images 440 may represent container images that can be implemented in provisioning layer 410, while images 441 may represent virtual machines that can be implemented in provisioning layer 411. These images may be generated prior to the migration requirement or may be generated at the time of the migration requirement. Further, management entity 430 may determine scheduling and deployment requirements for the one or more applications where the scheduling and deployment requirements may be based on operational requirements for the applications, such as times of interest, geographical locations of interest, or some other similar object of interest. From the operational requirements, configurations may be selected (such as physical nodes and operational times) in provisioning layer 411 to support the requirements of the one or more applications. Management entity 430 may further determine state information for the one or more applications operating in provisioning layer 410 and use the state information in configuring the one or more applications in provisioning layer 411. This state information may include processed and unprocessed sensor data, newly generated data for the application, identifiers for any objects of interest, or some other similar information. When the one or more applications are initiated in provisioning layer 411, management entity may provide the required state information alongside or as part of the image for the application. Accordingly, once a configuration is identified for deploying the one or more applications, management entity 430 deploys, at step 4, the one or more applications in the required configuration/format and provides the applications with any associated state information.

Although demonstrated in the example of FIG. 4 as migrating applications between physical nodes, it should be understood that the multiple provisioning layers may exist on the same physical nodes. For example, a first set of communication resources may exist on a physical node that correspond to a first provisioning layer, while a second set of communication resource may exist on the physical node that correspond to a second provisioning layer. During the execution of an application in the first provisioning layer, the application may be selected for migration to a second provisioning layer. Once selected rather than migrating the communication resources for the application off of the physical node, the application may instead be directed to use the communication resources provided to the second provisioning layer. In controlling the resources on a local physical node, one or more processing systems may obtain configuration information from a management entity indicating the resources that are allocated to each of the provisioning layers and what applications are associated with each of the applications.

Figure 5:
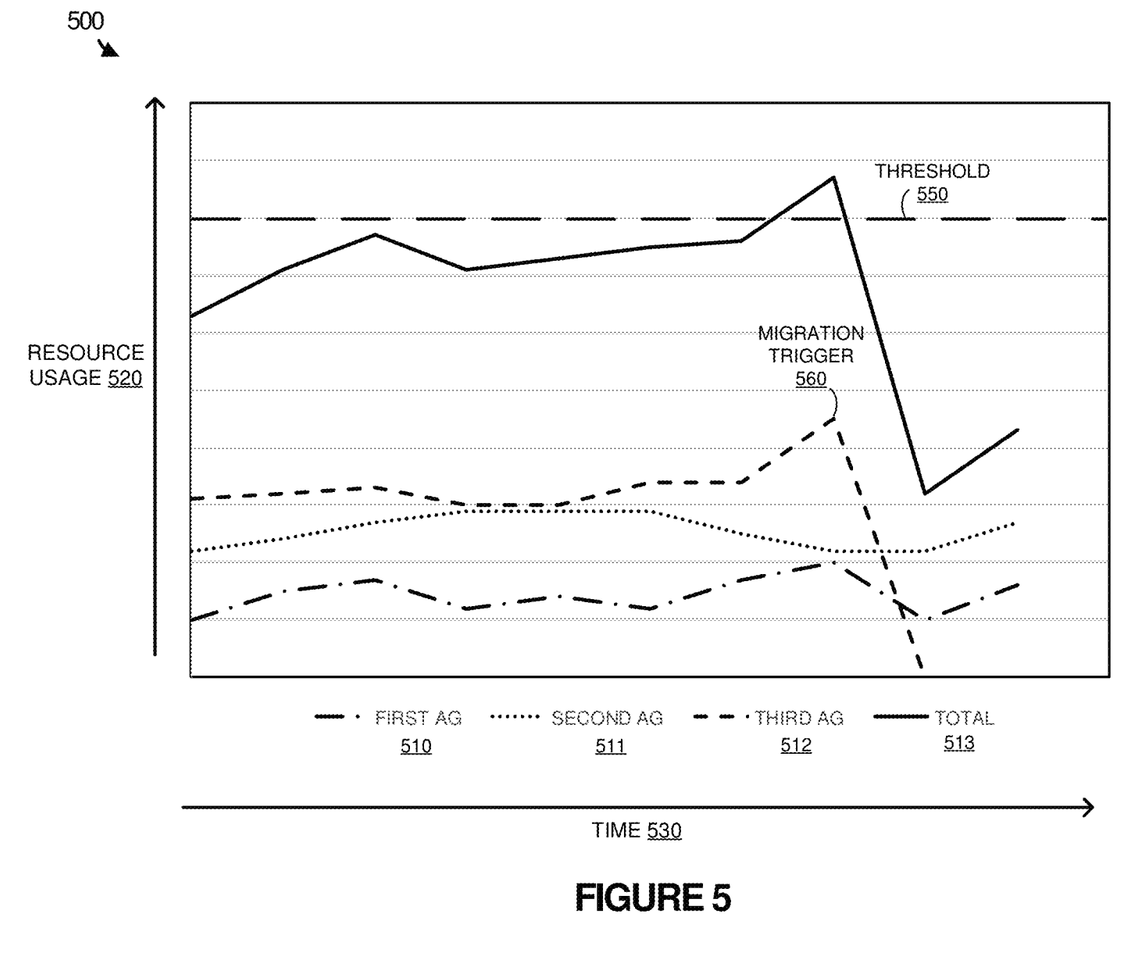
FIG. 5 illustrates a graph representative of resource usage in a provisioning layer according to an implementation.

FIG. 5 illustrates a graph 500 representative of resource usage in a provisioning layer according to an implementation. Graph 500 includes a horizontal axis representative of time 530 and a vertical axis representative of resource usage 520 for one or more physical nodes of a provisioning layer. Resource usage 520 may be representative of bandwidth usage, processing resource usage, storage usage, or some other resource usage. The lines in graph 500 are representative of resource usage for application groups 510-512, which may each correspond to one or more applications that correspond to an entity or quality of service level.

As described herein, when applications are deployed in a provisioning layer, the physical nodes of the provisioning layer may provide information about resource usage by the applications to a management service for the provisioning layer. As the resource usage information is obtained by the management service, the management service may aggregate and monitor the resource usage by the various applications. Here, the resource usage for a particular attribute is demonstrated as a graph that includes lines representative of resource usage for application groups 510-512 as well as a total resource usage represented by the line for total 513. As time progresses, the total resource usage for application groups 510-512 exceeds threshold 550 (migration criteria) causing a migration trigger 560.

In the present implementation, the management service identifies an application group 512 to be migrated to a second provisioning layer. Application group 512 may represent a group of applications with the lowest quality of service, a group of applications with the highest level of quality service, applications that were randomly selected, applications that were selected based on the tenant associated with the applications, or applications selected based on some other criteria. Once the applications are selected, the management service may initiate a process to deploy the third application group 512 in one or more secondary provisioning layers. This deployment operation may include stopping the execution of third application group 512 in the first provisioning layer and determining configuration requirements for third application group 512 in the one or more secondary provisioning layers. These configuration requirements may include any logical node format requirements for the secondary provisioning layers, communication protocol formatting requirements, or any other similar requirements for deploying the applications in the secondary provisioning layers. Further, the management service may identify state information related to each of the applications in third application group 512, wherein the state information may include processed and unprocessed sensor data, object areas of interest, trajectory information for objects of interest or some other similar information. From the state information, each of the applications of third application group 512 may be initiated in the secondary provisioning layers using the configuration requirements and the state information.

Here, once third application group 512 is migrated to the secondary provisioning layers in response to migration trigger 560, the resource usage in the first provisioning layer decreases. Consequently, each application group of application groups 510-511 may be provided with a higher quality of service, or prevent a lower quality of service, due to the increase in the availability of resources.

In some implementations, once the application group is deployed to the secondary provisioning layers, the management service may determine when to migrate the application group back to the first provisioning layer. In making the determination, the management service may determine when the resource usage satisfies second migration criteria and initiate the migration of the third application group back to the first provisioning layer. This second migration criteria may be related to the quantity of resources in use for the first provisioning layer, a quantity of time for which the resource usage was below threshold 550, or some other similar migration criteria. For example, the management service may monitor resource usage 520 over time 530 to determine when the total 513 remains below a second threshold value for a defined period of time. After the expiration of the period of time, the management service may initiate an operation to redeploy third application group 512 in the first provisioning layer.

In some implementations, when applications are deployed in the secondary provisioning layers, the management service associated with the secondary provisioning layers may generate and distribute the executable images of the application, may initiate execution of the application, may provide state information, or provide some other data to provide the required functionality of the applications in the secondary provisioning layers. While the applications are deployed in the secondary provisioning layers, the applications that were executed in the first provisioning layer may be stopped or placed in a non-active mode. In some examples, the stopped application may remain stored on the physical node, such that when it is desired to return the applications to the first provisioning layer, the applications may initiate execution. These applications may also be provided with the required state information from the application versions that were executing on the other provisioning layers. Although demonstrated as storing the applications on the physical nodes when operations of the application are migrated to another provisioning layer, it should be understood that data related to the applications may be removed from the physical nodes of the first provision layer upon deployment of the applications in the second provisioning layers. As the application data is removed from the first provisioning layer, when an event occurs to return the system to a prior state, the application data may be communicated to the required nodes in the first provisioning layer, wherein the application data may include executable data, state data, or some other similar data to make the application executable in the first provisioning layer.

In some examples, the management service for the first provisioning layer may be the same as the secondary provisioning layers, wherein the different provisioning layers may be associated with different qualities of service. For example, the first provisioning layer may include sensor resources, processing resources, and communication resources that provide better quality than the secondary provisioning layers. Thus, when the resource usage 520 reaches threshold 550, applications with a lower quality of service may be offloaded to other provisioning layers. In other examples, the management service for the first provisioning layer may be different for than the secondary provisioning layers. For example, the first provisioning layer may be operated by a first organization, while a second provisioning layer may be operated by a second organization. As a result, when a migration event is identified based on the resource usage, the management service for the first provisioning layer may provide configuration information and state information to the management service for the second provisioning layer to deploy the required applications.

Although demonstrated in the previous examples as deploying the applications to another provisioning layer with at least airborne or spaceborne node, it should be understood that the first provisioning layer may deploy at least a portion of the applications to another provisioning layer that provides processing resources via physical computing systems in a datacenter. In some implementations, in identifying the applications to be offloaded, the management service for the first provisioning layer may determine which of the applications are processing sensor data from sensors of the physical nodes. If any of the applications are not processing data from sensors, the applications may be offloaded to datacenter computing systems to limit the load on the first provisioning layer. In some examples, other considerations may be made in considering the applications to be migrated to the datacenter, including the quality of service for the applications, the quantity of sensor data required by the applications, or some other similar information.

Although demonstrated in the example of FIG. 5 as migrating an application immediately following the identification of a migration triggering event, it should be understood that the migration triggering event may cause a migration of an application at a future time. In some implementations, the migration criteria may be used to identify trends in the resource load on a particular provisioning layer. For example, a management service may determine when an increased load occurs at defined intervals. Once the trend is identified for the increased load, the management service may schedule the migration of one or more applications at, or before, the interval. The migrating applications may be identified based on the quality of service requirements, based on the resource usage of the applications, or some other similar factor.

Figure 6:
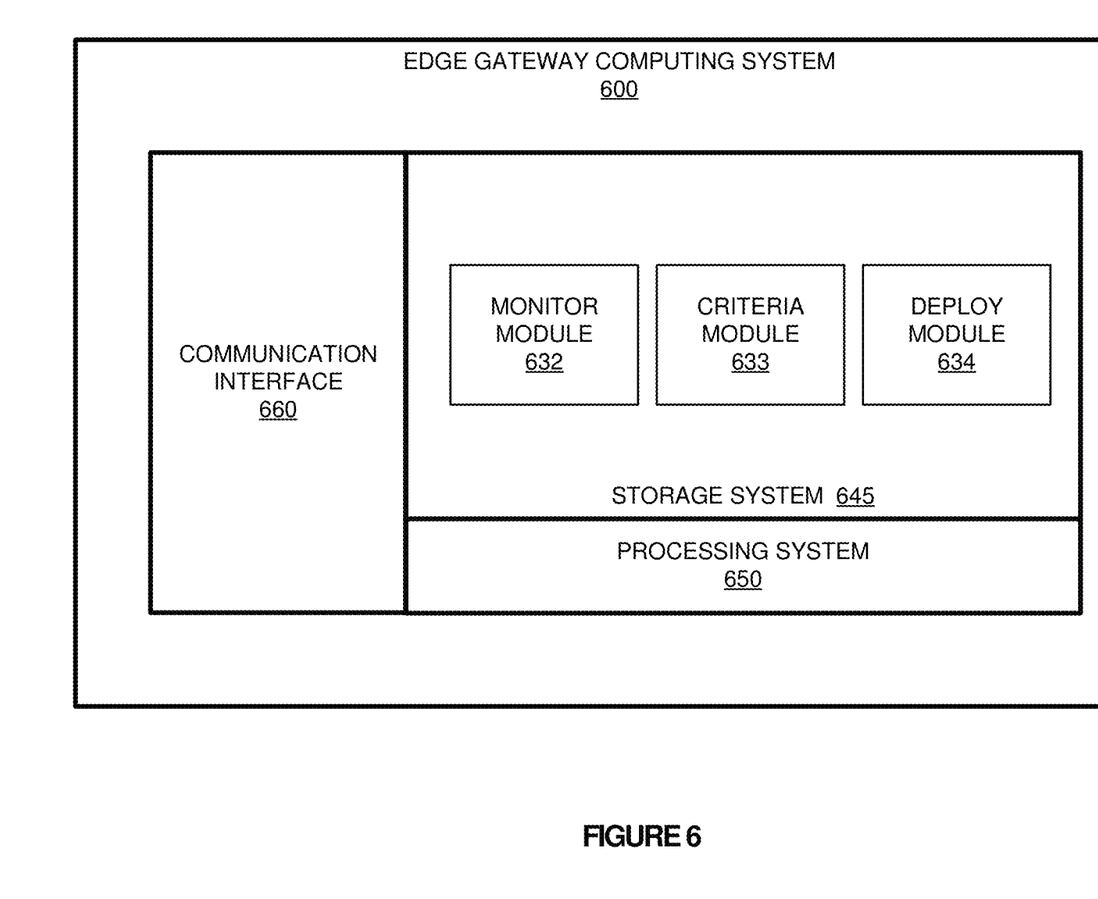
FIG. 6 illustrates a computing system to manage the migration of applications between provisioning layers according to an implementation.

FIG. 6 illustrates a computing system 600 to manage the migration of applications between provisioning layers according to an implementation. Computing system 600 is representative of any computing system or systems with which the various operational architectures, processes, scenarios, and sequences disclosed herein for a management service can be implemented. Computing system 600 is an example of management service 170 of FIG. 1 or management entity 430 of FIG. 4, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with physical nodes that correspond to one or more provisioning layers, wherein the communications may be used to obtain resource usage information and state information, as well as deploy applications to the physical nodes.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises monitor module 632, criteria module 633, and deploy module 634 capable of providing at least operation 200 described in FIG. 2. The operating software on storage system 645 may further include an operating system, utilities, drivers, network interfaces, applications, or some other type of software. When read and executed by processing system 650 the operating software on storage system 645 directs computing system 600 to operate as described herein.

In one implementation, monitor module 632 directs processing system 650 to monitor resource usage information for applications deployed on physical nodes of a provisioning layer associated with computing system 600. As described herein, tenants may generate applications that can be deployed and use the resources provided by the physical nodes of a provisioning layer. These applications may include operations to provide military, commercial, government, and civilian observation or monitoring operations, communications operations, navigation operations, weather operations, or research operations. In some implementations, the applications may be deployed as a logical node, wherein a management platform on the physical nodes may be used to provide the requisite processing resources, storage resources, sensor resources, communication resources, and the like. Thus, although multiple applications may execute on the same physical node, each of the applications may operate independently without recognizing the other applications on the physical node.

As the applications are executed by the physical nodes, the physical nodes may communicate resource usage information to computing system 600, wherein the resource usage information may correspond to processing resource usage, sensor resource usage, storage resource usage, or some other resource usage information. As the resource usage information is obtained, criteria module 633 directs processing system 650 to determine when the resource usage information satisfies migration criteria to offload one or more applications to another provisioning layer. For example, based on the bandwidth usage information, criteria module 633 may determine that the bandwidth usage in the provisioning layer exceeds a migration value.

In response to meeting the criteria, deploy module 634 may select one or more applications deployed in the provisioning layer to be offloaded to at least one other provisioning layer, and initiate an operation to deploy the one or more applications in the at least one other provisioning layer. In deploying the one or more applications, deploy module 634 may stop the execution of the applications in the first provisioning layer, and after stopping execution initiate the applications in the other provisioning layers. In some examples, after selecting the applications to be offloaded, deploy module 634 may identify deployment requirements for the application in the secondary provisioning layers and deploy the one or more applications in the secondary provisioning layers. In some implementations, the deployment requirements may comprise imaging requirements (e.g., virtual machine image requirements, container image requirements, and the like), may comprise communication protocol requirements, sensor interface requirements, or some other similar requirements. Further, deploy module 634 may obtain state information related to the current state of the application in the first provisioning layer prior to stopping the execution of the application in the first provisioning layer. This state information may be communicated to the applications as they are deployed continue the operations of the applications from the first provisioning layer. Thus, if an object of interest were identified for an application using sensors in the first provisioning layer, state information about the object of interest may be communicated to the application in the second provisioning layer, permitting the application to continue the desired operations with respect to the object of interest.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
    monitoring resource usage for a plurality of applications executing across a first plurality of physical nodes comprising airborne nodes or spaceborne nodes, wherein a first application of the plurality of applications is configured to monitor an object of interest using one or more sensors of the first plurality of physical nodes;
    determining when the resource usage by the plurality of applications satisfies migration criteria;
    when the resource usage by the plurality of applications satisfies the migration criteria, identifying at least the first application to be offloaded to a second plurality of physical nodes comprising airborne nodes or spaceborne nodes different than the first plurality of physical nodes;
    determining if the second plurality of physical nodes can accommodate sensor requirements of the first application before transitioning the first application; and
    based at least on the second plurality of physical nodes determined to be unable to accommodate the sensor requirements, transitioning a data processing portion of the first application to the second plurality of physical nodes and maintaining a sensor portion of the first application on the first plurality of physical nodes by at least determining state information resultant from execution of the first application, and providing the state information to associated ones of the second plurality of physical nodes for execution of the first application based at least on the state information.

2. The method of claim 1, wherein the resource usage comprises at least one among communication bandwidth usage, processing resource usage, and storage usage.

3. The method of claim 1, further comprising determining an anticipated time for the resource usage to meet the migration criteria based at least on monitored trends in the resource usage over time that indicate predicted intervals for which the resource usage meets the migration criteria.

4. The method of claim 1 further comprising, for at least the first application, converting a first resource configuration associated with the first plurality of physical nodes to a second resource configuration associated with the second plurality of physical nodes, wherein the first resource configuration and the second resource configuration each comprise protocol configurations.

5. The method of claim 1 further comprising, transitioning at least the first application to the second plurality of physical nodes by at least generating a software image configuration compatible with the second plurality of physical nodes, wherein the software image configuration is different than used for the first plurality of physical nodes.

6. The method of claim 1, further comprising:
based at least on the second plurality of physical nodes determined to be unable to accommodate the sensor requirements, determining at least a second application of the plurality of applications for transition to the second plurality of physical nodes.

7. The method of claim 1 further comprising:
based at least on the second plurality of physical nodes determined to be able to accommodate the sensor requirements, transitioning the data processing portion and the sensor portion of the first application to the second plurality of physical nodes.

8. The method of claim 1, further comprising identifying at least the first application to be offloaded to the second plurality of physical nodes based on a quality of service associated with at least the first application.

9. The method of claim 1, wherein identifying at least the first application to be offloaded to the second plurality of physical nodes comprises:
(a) identifying the first application to be offloaded based on a quality of service associated with the first application;
(b) in response to deployment of the first application, determining whether the deployment of the first application satisfies migration criteria;
(c) when the deployment of the first application fails to satisfy the migration criteria, repeating steps (a) and (b) to identify another application to be offloaded.

10. An apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
monitor resource usage for a plurality of applications executing across a first plurality of physical nodes comprising airborne nodes or spaceborne nodes, wherein a first application of the plurality of applications is configured to monitor an object of interest using one or more sensors of the first plurality of physical nodes;
determine when the resource usage by the plurality of applications satisfies migration criteria;
when the resource usage by the plurality of applications satisfies the migration criteria, identify at least the first application to be offloaded to a second plurality of physical nodes comprising airborne nodes or spaceborne nodes different than the first plurality of physical nodes;
determine if the second plurality of physical nodes can accommodate sensor requirements of the first application before transitioning the first application; and
based at least on the second plurality of physical nodes determined to be unable to accommodate the sensor requirements, transition a data processing portion of the first application to the second plurality of physical nodes and maintain a sensor portion of the first application on the first plurality of physical nodes by at least determining state information resultant from execution of the first application, and providing the state information to associated ones of the second plurality of physical nodes for execution of the first application based at least on the state information.

11. The apparatus of claim 10, wherein the resource usage comprises at least one among communication bandwidth usage, processing resource usage, and storage usage.

12. The apparatus of claim 10, wherein the program instructions further direct the processing system to:
determine an anticipated time for the resource usage to meet the migration criteria based at least on monitored trends in the resource usage over time that indicate predicted intervals for which the resource usage meets the migration criteria.

13. The apparatus of claim 12, wherein the program instructions further direct the processing system to:
for at least the first application, convert a first resource configuration associated with the first plurality of physical nodes to a second resource configuration associated with the second plurality of physical nodes, wherein the first resource configuration and the second resource configuration each comprise protocol configurations.

14. The apparatus of claim 10, wherein the program instructions further direct the processing system to:
transition at least the first application to the second plurality of physical nodes by at least generating a software image configuration compatible with the second plurality of physical nodes, wherein the software image configuration is different than used in the first plurality of physical nodes.

15. The apparatus of claim 10, wherein the program instructions further direct the processing system to:
based at least on the second plurality of physical nodes determined to be unable to accommodate the sensor requirements, determine at least a second application of the plurality of applications for transition to the second plurality of physical nodes.

16. The apparatus of claim 10, wherein the program instructions further direct the processing system to:
based at least on the second plurality of physical nodes determined to be able to accommodate the sensor requirements, transition the data processing portion and the sensor portion of the first application to the second plurality of physical nodes.

17. The apparatus of claim 10, wherein the program instructions further direct the processing system to:
identify at least the first application to be offloaded to the second plurality of physical nodes based on a quality of service associated with at least the first application.

18. The apparatus of claim 10, wherein identifying at least the first application to be offloaded to the second plurality of physical nodes comprises:
(a) identifying the first application to be offloaded based on a quality of service associated with the first application;
(b) in response to deployment of the first application, determining whether the deployment of the first application satisfies migration criteria;
(c) when the deployment of the first application fails to satisfy the migration criteria, repeating steps (a) and (b) to identify another application to be offloaded.

19. A system comprising:
a first provisioning layer formed across a plurality of first physical nodes comprising airborne nodes or spaceborne nodes;
a management service computing system configured to:
monitor resource usage for a plurality of applications executing in the first provisioning layer, wherein a first application of the plurality of applications is configured to monitor an object of interest using one or more sensors of the first physical nodes;
determine when the resource usage by the plurality of applications satisfies migration criteria;
based on the resource usage by the plurality of applications satisfying the migration criteria, identify at least processing portions of at least the first application to be offloaded to a second provisioning layer while maintaining sensing portions of at least the first application in the first provisioning layer; and
initiate deployment of at least the processing portions of the one or more applications in the second provisioning layer.

20. The system of claim 19, wherein the management service computing system is configured to identify at least the first application to be offloaded to the second provisioning layer based on a quality of service associated with at least the first application.

21. A method comprising:
monitoring resource usage for a plurality of applications executing across a first plurality of physical nodes comprising airborne nodes or spaceborne nodes, wherein a first application of the plurality of applications is configured to monitor an object of interest using one or more sensors of the first plurality of physical nodes;
identifying an anticipated time that the resource usage will meet migration criteria based at least on monitored trends in the resource usage that indicate predicted intervals for which the resource usage meets the migration criteria;
identifying at least the first application to be offloaded to a second plurality of physical nodes; and
initiating deployment of at least the first application in the second plurality of physical nodes in accordance with the anticipated time by at least transitioning a processing portion of the first application to the second plurality of physical nodes and maintaining a sensor portion of the first application on the first plurality of physical nodes.

22. The method of claim 21, wherein the resource usage comprises at least one among communication usage, processing resource usage, and storage usage.

23. The method of claim 21 further comprising, for the first application, converting a first resource configuration associated with the first plurality of physical nodes to a second resource configuration associated with the second plurality of physical nodes.

24. The method of claim 21 further comprising initiating deployment of at least the first application to the second plurality of physical nodes by at least generating a software image configuration compatible with the second plurality of physical nodes, wherein the software image configuration is different than used in the first plurality of physical nodes.

25. The method of claim 21, further comprising identifying at least the first application to be offloaded to the second plurality of physical nodes based on a quality of service associated with at least the first application.

* * * * *